United States Patent Office 2,915,279
Patented Dec. 1, 1959

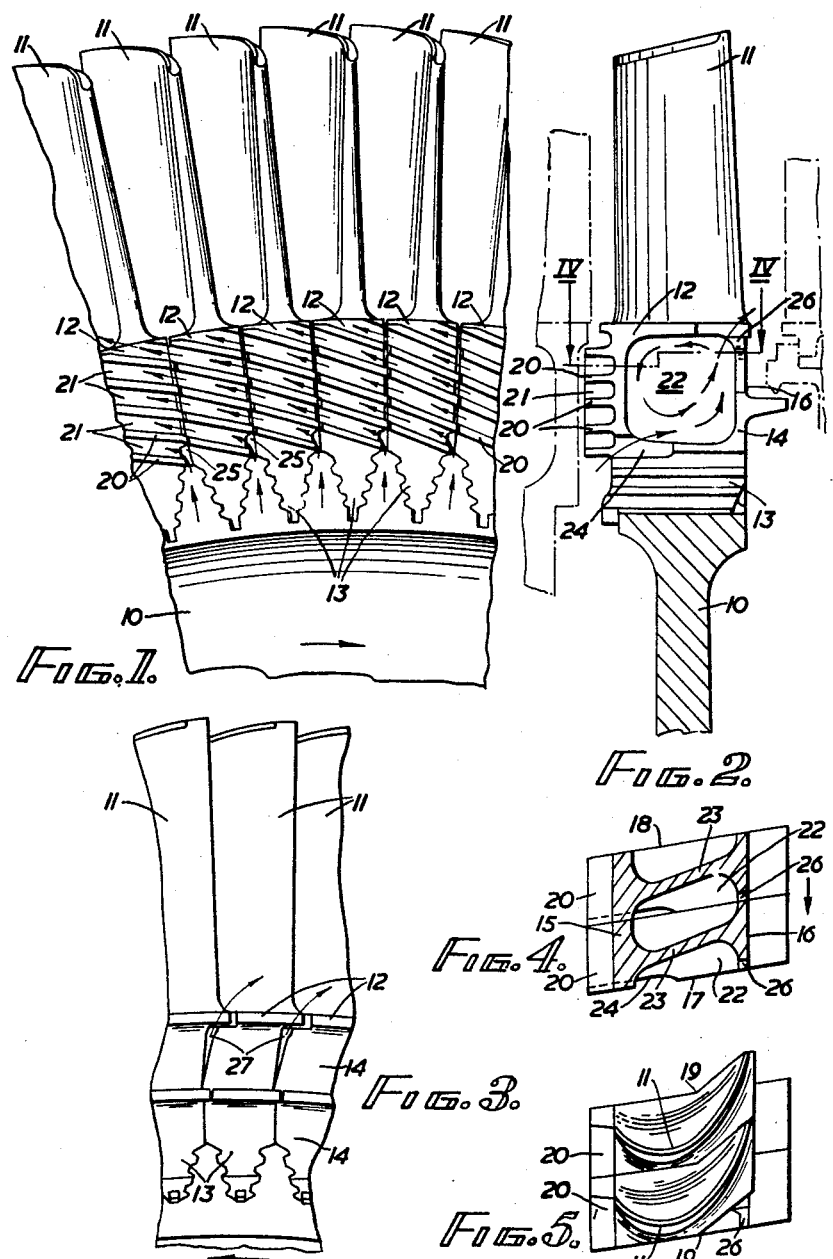

2,915,279

COOLING OF TURBINE BLADES

Reginald Henry Douglas Chamberlin, Ealing, London, England, assignor to D. Napier & Son Limited, London, England, a company of Great Britain Application June 29, 1954, Serial No. 440,179

Claims priority, application Great Britain July 6, 1953

5 Claims. (Cl. 253—39.15)

This invention relates to the cooling of turbine blades for gas turbines by means of cooling air or other gas.

As is well known the blades of gas turbines are required to operate at high temperatures and in addition to the difficulties experienced in the manufacture of blades which are capable of operating at such temperatures, difficulties are also experienced in securing the blades to the rotor disc or like rotary supporting member (hereinafter for convenience called "the rotor disc") owing to the high stresses applied to the roots of the blades and through them to the disc, coupled with the high temperatures which the roots tend to attain. To reduce or overcome this latter difficulty it has been proposed to cool the root portions of the turbine blades and the present invention is particularly concerned with such so-called root cooling.

It is an object of the invention to provide improved cooling of turbine blades which will assist in maintaining the turbine blade roots, or at least the parts thereof adjacent to the rotor disc, at an acceptable operating temperature.

A turbine blade according to the present invention has a root portion which is formed so that it will enclose between it and the adjacent side of the root portion of a similar turbine blade mounted adjacent to it in the rotor disc, a cavity having air inlet and outlet passages by which cooling air or other gas (hereinafter assumed for convenience to be air) can be caused to enter and leave the cavity continuously during operation.

Conveniently the form of the root portion of the blade is such as to provide between the root portions of each pair of blades spiral ribs on the annular upstream face, thus providing between the root portions a corresponding system of spiral passages through which cooling air can pass.

Conveniently the ribs are formed as flat blade-like elements extending from an intermediate part of the blade root lying between the so-called "fir tree" or other portion by which the blade is secured to the turbine rotor disc or the like and the portion constituting the blade proper on which the working fluid acts.

Moreover the direction of inclination of the ribs is preferably such in relation to the direction of rotation of the turbine rotor that the ribs themselves tend to act after the manner of a centrifugal pump to cause or assist the flow of cooling air through the slots or passages between them.

In one convenient arrangement there would be at least four ribs on each blade in which case each spiral passage might traverse four or five blade roots.

According to another aspect of the invention, the turbine blades may have their intermediate root portions formed so that each intermediate root portion encloses between it and the adjacent intermediate root portions of similar blades on each side of it a cavity having inlet and outlet passages by which cooling air can be caused to enter and leave the cavity continuously during operation.

From the above it will be apparent that according to one aspect of the invention a turbine rotor assembly includes a blade-carrying disc or other supporting member and a series of blades having their root portions secured to the supporting member and including parts which cooperate to form between the adjacent faces of the root portions of each adjacent pair of blades a cavity with inlet and outlet passages by which cooling air can enter and leave such cavity continuously during operation, each cavity conveniently being formed by cooperating recesses in the adjacent faces of the pair of root portions forming it.

Further, the air inlet passage leading to each cavity is preferably formed at a point in the cavity between the two root portions adjacent to the blade support, while the air outlet passage is formed at an opposite point in the cavity between the two root portions, that is to say at a point remote from the rotor disc and adjacent to the blade part proper.

Moreover the air inlet passage will normally enter the cavity from the upstream side of the blades while the air outlet passage will leave the cavity on the downstream side of the blades, the cooling air thus being passed through the cavities from the upstream to the downstream side of the rotor disc. It will also be apparent that with the arrangement described above in which the air outlet passage leaves the cavity at a point adjacent to the blades proper, this air will conveniently pass into the stream of working fluid and be carried with it.

In any case a turbine blade according to the invention may if desired include a series of flanges arranged on the upstream face of the root portion, the flanges on adjacent root portions being arranged to form a series of substantially continuous spiral cooling air passages.

The invention may be carried into practice in various ways but the following is a description by way of example of one construction of turbine rotor embodying blades according to the present invention.

In the drawings Figure 1 is a fragmentary front elevation of part of the rotor disc looking along the axis of the rotor, with a number of blades in position thereon, Figure 2 is a sectional view on a radial plane perpendicular to the axis of the rotor through the edge of the rotor disc, and through a blade, part of an adjacent rotor disc being shown in chain lines, Figure 3 is a fragmentary rear elevation of part of the rotor disc and blades, Figure 4 is a sectional view through a blade on the line IV—IV of Figure 2, and Figure 5 is an end view of a number of blades in position on the rotor disc looking inwards towards the rotor axis.

The rotor in the example to be described may be of known type comprising a series of discs (only one of which 10 is shown in detail in the drawings) each supporting a so-called ring of turbine blades 11, it being understood, however, that it may be possible, due to the cooling of the blade roots themselves effected by the invention, to take advantage of this fact in the constructional design of the rotor. The bearings of the rotor are supplied with pressurised cooling air in known manner, for example from a suitable point in the compressor forming part of the gas turbine engine of which the turbine rotor is a part, this cooling air being supplied, for example, by way of an internal bore in the rotor shaft. In addition cooling air is supplied to the upstream face of each rotor disc adjacent to the rotor axis.

Each of the turbine blades to which the invention is applied comprises a portion 11 constituting the blade proper, on which the working fluid reacts and a blade root portion including a so-called platform 12 from which the blade proper extends, an inner root portion 13 of the well known fir-tree type engaging a slot in the rotor disc 10 and serving to secure the blade to the disc, and an intermediate root portion 14 between the fir-tree portion and the platform 12 which, when viewed in a direction normally to the rotational axis of the rotor disc (as in Figure 2), is of approximately rectangular, for example square, shape and when viewed in a radial direction (as in Figure 4), has an outline generally in the form of a parallelogram, two sides 15 and 16 of the parallelogram being parallel to the plane of the rotor disc 10 while the two remaining sides 17 and 18 are inclined to the axis of the rotor in the same direction as the general inclination of the trailing edge portion of the blade proper. The two sides 15 and 16 of the intermediate root portion 14 will for convenience herein be referred to respectively as the upstream and downstream faces of the intermediate root portion while the other two sides 17 and 18 will be referred to for convenience respectively as the leading and trailing faces of the root portion as determined by the direction of rotation of the rotor disc. The main body of the intermediate root portion 14 is machined or cast in the general form of a parallelepiped but the actual platform 12, that is the part immediately adjacent to the blade proper 11, is in the form of a relatively thin plate-like element which is slightly cranked at 19 adjacent the downstream face 16, the inclination of the leading and trailing faces of the platform to the axis of the rotor disc being somewhat increased from this point to the downstream face. The platform proper 12 thus conforms more exactly to the profile of the blade proper than does the intermediate root portion 14.

The upstream face 15 of each intermediate root portion 14 is provided with a series of four parallel axially projecting flanges or ribs 20 extending the full width of the upstream face of the intermediate root portion. The flanges of the respective root portions are uniformly radially spaced from each other and are generally similarly spirally inclined in such manner that the ends of the flanges 20 on each intermediate root portion are aligned with the ends of the flanges on the intermediate root portions of the adjacent blades and the flanges thus together form in effect a multistart spiral vane system on the annular surface formed by the close-fitting upstream faces 15 of the intermediate root portions 14. The direction of the spiral system is rearwardly and outwardly inclined in relation to the direction of rotation of the rotor disc so as to assist the passage of cooling air radially outwards through the passages between the flanges from the inner end of the flanges to the outer end thereof adjacent the blades themselves.

For ease of manufacture of the flanges 20 on the blade platforms are preferably machined as flat plane elements defining rectangular slots 21 for the passage of the cooling air, and where the total number of blades on a rotor disc is high, the resultant spiral thread-type vanes will have substantially smooth curvature.

It will be understood that since the cooling air is encouraged to flow between the flanges 20 on the faces of the intermediate root portions 14, each stream of air will make contact with five separate blades, and the cooling effect of a given quantity of air will be substantially increased, as opposed to any arrangement in which the cooling air passes directly radially over any single blade. Moreover the form of the spiral vanes encourages a relatively high velocity in the cooling air passing between the flanges, and the cooling effect is correspondingly increased.

In addition to the formation of the flanges 20 on the upstream axial face 15 of each blade in the manner described above, the opposite circumferentially presented leading and trailing faces 17 and 18 of the intermediate root portion 14 of each blade are each provided with a recess or depression 22 of approximately square cross section in planes containing the axis of the rotor disc (as seen in Figure 2), the corners of the approximately rectangular depressions being rounded off, while the inner or back walls of the depressions, which thus constitute webs 23 between the two depressions in each intermediate root portion, are inclined in a direction which corresponds to the direction of inclination of the blade proper. In the example illustrated the angle of inclination of the back walls or webs 23 in relation to the axis of the rotor disc is approximately 25° when viewed in cross sections parallel to the axis of the rotor and to a tangent at right angles to the blade (as in Figure 4), each intermediate portion is thus in the general form of a Z, the upper lower limbs of the Z being constituted by the upstream and downstream faces 15 and 16 of the intermediate portion while the inclined limb of the Z is formed by the inclined web 23 separating the two depressions 22 respectively in the leading and trailing faces 17 and 18.

When the blades are assembled in the rotor disc the intermediate portions 14 of their roots lie closely adjacent to one another and a series of cavities is thus formed by the cooperating depressions 22 in the leading and trailing faces of these intermediate root portions.

Cooling air is introduced into the cavities from the upstream face of the rotor disc, to which it is fed from the rotor bearings, and passes out through apertures adjacent the downstream faces of the intermediate root portions, and the arrangement is such that the air is given a whirling or vortex motion in each cavity, and may travel in the form of a spiral from one end to the other of each cavity.

For this purpose the corner of the leading face 17 of each intermediate root portion 14 adjacent to both the upstream face 15 and the fir-tree root portion 13 is cut away as indicated at 24 in Figures 2 and 4, to provide in cooperation with the next root portion a passage or aperture 25 (see Figure 1), through which cooling air from the upstream face of the rotor disc is introduced into the adjacent side of the respective cavity in the form of a jet of air, the direction of the jet being such that the air tends to rotate in a vortex or spiral within the cavity (as shown in Figure 2). A corresponding cut-away portion 26 is provided in the opposite corner of the trailing face 17 of each intermediate root portion 14 to provide in cooperation with the next adjacent blade an aperture 27 (see Figure 3) through which the cooling air is exhausted on the downstream side of the rotor disc at points adjacent to the platforms 12.

The creation of eddies or vortices in the cavities greatly improves the cooling effect of the air, and substantially the whole of the internal surfaces of the cavities are swept by cooling air and no stagnant pockets tend to form.

The arrangement described, including the flanges 20 formed on the upstream face 15 of the intermediate root portion 14 of each blade, and the cavities 22 between adjacent blades, may be particularly suitable for use in the first stage of a multi-stage turbine where the greatest degree of root cooling is usually desirable. In practice it has been found that with blades having intermediate root portions provided with cooling cavities and external flanges as described above it is possible to maintain a high static temperature gradient across the blade roots as a whole, the temperature difference being in some cases of the order of 600° C.

In such an arrangement the later stage or stages of the turbine may have blades formed with cooling recesses 22 in their leading and trailing faces without flanges 20 in accordance with the present invention on their upstream faces.

The creation of eddies or vortices in the cavities greatly improves the cooling effect of the air, and substantially the whole of the internal surfaces of the cavities are swept by cooling air and no stagnant pockets tend to form.

The arrangement described, including the flanges 20 formed on the upstream face 15 of the intermediate root portion 14 of each blade, and the cavities 22 between adjacent blades, may be particularly suitable for use in the first stage of a multi-stage turbine where the greatest degree of root cooling is usually desirable. In practice it has been found that with blades having intermediate root portions provided with cooling cavities and external flanges as described above it is possible to maintain a high static temperature gradient across the blade roots as a whole, the temperature difference being in some cases of the order of 600° C.

The later stages of the turbine may have blades formed with cooling recesses 22 in their leading and trailing faces, in accordance with the present invention, but the flanges 20 may be omitted.

What I claim as my invention and desire to secure by Letters Patent is:

1. A turbine blade having a root portion, an intermediate portion and a blade proper portion, in which one face of the intermediate portion, which lies in a plane transverse to the axis of rotation of the blade, is formed with at least two generally parallel radially spaced projecting ribs which are inclined at a relatively large angle to the longitudinal axis of the blade, and at a relatively smaller angle to planes transverse to the longitudinal axis, the pitch of the ribs being approximately equal to the radial distance between adjacent ribs.

2. A rotary turbine blade as claimed in claim 1 including means for supplying cooling fluid to the radially inner end of the channel formed between the ribs and in which the inclination of the ribs is such in relation to the direction of rotation of the blade about the turbine rotor axis that the ribs tend to assist the flow of cooling fluid through the channel formed between the ribs.

3. A turbine rotor comprising a turbine disc and a series of circumferentially spaced turbine blades mounted thereon, each blade having an inner root portion, an intermediate portion, and a blade portion proper, one face of the intermediate portion of each blade which lies in a plane parallel to the general plane of the turbine disc being provided with at least two generally parallel ribs which are inclined at a relatively large angle to a radius from the rotor axis passing through the mid point of each rib, the pitch of the ribs of each blade being approximately equal to the radial distance between adjacent ribs and equal to one another, thus forming a multi-start system of spiral vanes.

4. A turbine rotor comprising a turbine disc and a series of turbine blades mounted around the periphery thereof, each blade having a blade portion proper, an intermediate portion and an inner root portion, the intermediate portion of each blade being formed with a recess on a side which lies adjacent another blade of said series of said blades, providing cavities between the blades, the blades being formed also with inlet and outlet passages by which cooling fluid is admitted to and exhausted from the cavities, said inlet and outlet passages of each blade being relatively axially and radially spaced, the inlet passage to each cavity being substantially tangential to the adjacent part of the inner surface of the cavity and both passages being of relatively restricted cross sectional area in relation to the cross section of the cavities so causing circulatory flow of the cooling fluid within the cavities.

5. A turbine rotor as claimed in claim 4, in which said intermediate portion of each blade is formed with a still further recess on another side thereof adjacent a still further blade of said series, said recesses lying in planes substantially parallel to the axis of the rotor, and a generally radial web separating the two said recesses.

References Cited in the file of this patent

UNITED STATES PATENTS

| 1,819,864 | Bloomberg | Aug. 18, 1931 |
| 2,141,401 | Martinka | Dec. 27, 1938 |
| 2,603,453 | Sollinger | July 15, 1952 |

FOREIGN PATENTS

| 652,099 | Great Britain | Apr. 18, 1951 |
| 860,438 | Germany | Dec. 22, 1952 |
| 998,679 | France | Sept. 26, 1951 |